(12) United States Patent
Fujii et al.

(10) Patent No.: US 6,994,286 B2
(45) Date of Patent: Feb. 7, 2006

(54) MAGNETIC TAPE CARTRIDGE

(75) Inventors: Akihiko Fujii, Odawara (JP); Seiji Tsuyuki, Odawara (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 31 days.

(21) Appl. No.: 10/640,243

(22) Filed: Aug. 14, 2003

(65) Prior Publication Data
US 2004/0035970 A1 Feb. 26, 2004

(30) Foreign Application Priority Data
Aug. 23, 2002 (JP) ............................. 2002-243590

(51) Int. Cl.
*G11B 23/107* (2006.01)
(52) U.S. Cl. ..................................... 242/348
(58) Field of Classification Search ................ 242/348, 242/348.2, 347, 347.2; 360/132
See application file for complete search history.

(56) References Cited

U.S. PATENT DOCUMENTS

| | | | | |
|---|---|---|---|---|
| 3,637,152 A | * | 1/1972 | Okamoto | |
| 3,858,829 A | * | 1/1975 | Bradt et al. | |
| 4,156,511 A | * | 5/1979 | Gell | 242/348 |
| 4,285,554 A | * | 8/1981 | Bell et al. | |
| 4,294,418 A | * | 10/1981 | Gell | 242/348 |
| 4,566,653 A | * | 1/1986 | Bettinger et al. | |
| 5,199,593 A | * | 4/1993 | Kita | |
| 5,868,338 A | * | 2/1999 | Martin et al. | 242/348 |
| 6,345,779 B1 | * | 2/2002 | Rambosek | 242/348.2 |
| 6,505,789 B2 | * | 1/2003 | Ridl et al. | 242/348.2 |
| 6,525,907 B1 | * | 2/2003 | Takahashi et al. | 360/132 |
| 6,577,471 B1 | * | 6/2003 | Morita et al. | 360/132 |

FOREIGN PATENT DOCUMENTS

| | | |
|---|---|---|
| JP | 11-306722 | 11/1999 |
| JP | 2001-148179 | 5/2001 |
| JP | 2001-266533 | 9/2001 |

* cited by examiner

*Primary Examiner*—William A. Rivera
(74) *Attorney, Agent, or Firm*—Sughrue Mion, PLLC

(57) ABSTRACT

A magnetic tape cartridge is constructed by rotatably housing a reel having magnetic tape wound therearound within a cartridge case. The cartridge case is constructed by an upper case and a lower case. The cartridge case has a tape extraction opening in a side wall thereof. The upper case and the lower case are fixed by welding at an abutment surface P, where the upper case and the lower case abut each other. In addition, vertically extending ribs that alternately extend up and down beyond the abutment surface P are provided on the inner surfaces of the side walls of the upper case and the lower case in the vicinity of the opening. By this construction, the strength of the cartridge case in the vicinity of the opening is improved, thereby preventing damage thereto even when the magnetic tape cartridge is dropped or the like.

9 Claims, 4 Drawing Sheets

MAGNETIC TAPE CARTRIDGE

BACKGROUND OF THE INVENTION

1. Field of the Invention

The present invention relates to a magnetic tape cartridge comprising a single reel having magnetic tape wrapped therearound, rotatably housed within a cartridge case. Particularly, the present invention relates to the structure of the cartridge case.

2. Description of the Related Art

There are known magnetic tape cartridges of the type wherein a single reel having magnetic tape wrapped therearound is rotatably housed within a cartridge case, as disclosed in, for example, Japanese Unexamined Patent Publication Nos.11 (1999)-306722, 2001-148179, and 2001-266533. These magnetic tape cartridges are conventionally employed as recording media in external memory devices for computers and the like.

FIG. 10 is a perspective view that shows the entirety of a magnetic tape cartridge 1 of this type, in a state in which a slide door 11 is open. A tape extraction opening 10 is formed on a side wall of a cartridge case 4 formed by fixing an upper case 2 and a lower case 3. The tape extraction opening 10 is formed across the upper case 2 and the lower case 3, in the vicinity of a corner. The slide door 11 for opening and closing the opening 10 is slidably provided therein. A magnetic tape 6 is employed to store data for a computer or the like. A leader pin 5 for extraction of the magnetic tape 6 is fixedly attached to a distal end thereof. When the magnetic tape cartridge 1 is loaded into a recording/reproducing apparatus, a pin holding member of the recording/reproducing apparatus engages the leader pin 5, pulls the magnetic tape 6 out from the cartridge case 4, and performs loading of the magnetic tape 6 into the recording/reproducing apparatus. During an unloading operation, the magnetic tape 6 is wound onto a reel 7, and the pin holding member returns the leader pin 5 to within the cartridge case 4.

The cartridge case 4 is formed by fastening the upper case 2 and the lower case 3, formed from synthetic resin, to each other with a plurality of screws (as disclosed in Japanese Unexamined Patent Publication No. 2001-148179). Alternatively, the cartridge case 4 may be formed by integrating the upper case 2 and the lower case 3 via ultrasonic welding of abutment surfaces of each of the side walls thereof (as disclosed in Japanese Unexamined Patent Publication No. 2001-266533). The leader pin 5, with its axis being oriented vertically, is removably held in the vicinity of the tape extraction opening 10 straddling the upper case 2 and the lower case 3. The slide door 11 for opening and closing the tape extraction opening 10 is urged toward the closed position by a spring.

In the magnetic tape cartridge 1 having the construction as described above, the tape extraction opening 10 is formed in the vicinity of a corner of the cartridge case 4, which is square in shape. Space for a tape path, as well as space for a path for the pin holding member of the recording/reproducing apparatus needs to be secured in the periphery of the position within the opening 10 at which the leader pin 5 is housed. Therefore, screws for fixing the upper case 2 and the lower case 3 cannot be provided at this position, but are provided at positions remote from this area (as disclosed in Japanese Unexamined Patent Publication No. 2001-148179). There is no side wall in the cartridge case 4 where the opening 10 is provided. In addition, there is no portion in the vicinity of the tape extraction opening 10 which is fixed by screws. Further, a groove 20 for guiding the leader pin 5 is formed in the bottom surface of the lower case 3. Accordingly, the structural integrity of the cartridge case at this portion is low.

During handling of the magnetic tape cartridge 1, there is a possibility that the cartridge 1 maybe dropped on the floor. If the corner having the tape extraction opening 10, that is, the portion having the lowest strength, strikes the floor when the cartridge 1 is dropped, the probability that the cartridge case 4 will crack at that portion, thereby damaging the magnetic tape cartridge 1, is high.

In order to improve the bonding strength between the upper case and the lower case, ultrasonic welding of the upper case and the lower case has been considered (as disclosed in Japanese Unexamined Patent Publication No. 2001-266533). However, simply welding the abutment surfaces of the upper case and the lower case to each other does not yield sufficient strength. The welded abutment surfaces may act as breaking lines, causing the side walls to bend inward when the cartridge is dropped.

SUMMARY OF THE INVENTION

The present invention has been developed in view of the above circumstances. It is the object of the present invention to provide a magnetic tape cartridge with improved strength, such that the vicinity of a tape extraction opening of a cartridge case is not damaged, even if an impact is imparted thereto by the cartridge being dropped or the like.

To achieve the object stated above, the magnetic tape cartridge according to the present invention comprises:

a cartridge case formed of an upper case and a lower case;

a single reel rotatably housed within the cartridge case;

a magnetic tape wound around the single reel; and a tape extraction opening provided on a side wall of the cartridge case; wherein the cartridge case is integrated by welding abutment surfaces of the upper case and the lower case to each other; and vertically extending ribs that extend over the abutment surfaces are provided on the inner surfaces of the side walls of the upper case and the lower case.

The ribs are provided such that one of the upper case and the lower case is provided with a first rib; and the other of the upper case and the lower case is provided with two ribs that sandwich the first rib therebetween. However, a greater number of ribs may be provided.

The ribs are preferably provided such that lateral surfaces of adjacent ribs are welded to each other and/or such that portions of the ribs that extend beyond the abutment surfaces are welded to the side walls of the case into which the ribs extend. By adopting this construction, the strength can be further improved.

According to the magnetic tape cartridge of the present invention, the abutment surfaces of the upper and lower cases are welded to each other, and vertically extending ribs that extend beyond the abutment surfaces are alternately provided on the inner surfaces of the side walls of each case, in the vicinity of the opening. Therefore, the portions of the ribs that extend beyond the abutment surfaces increase the strength of the abutment surfaces in the vicinity of the opening, in addition to the fixing by welding. The strength of the corner in the vicinity of the opening of the case can be improved dramatically without interfering with a tape path. Accordingly, shift between the upper and lower cases can be prevented, which makes separation of the welded portions less likely to occur when impact is imparted on the cartridge when it is dropped or the like.

In addition, the ribs are provided on the inner surfaces of the side walls of each case in the vicinity of the opening. Therefore, entry of welding dust generated in the vicinity of the opening during welding can be prevented.

Further, in the case that lateral surfaces of adjacent ribs are welded to each other and/or portions of the ribs that extend beyond the abutment surfaces are welded to the side walls of the case into which the ribs extend, the strength of the corner in the vicinity of the opening of the case can be further improved.

DESCRIPTION OF THE PREFERRED EMBODIMENTS

Hereinafter, the present invention will be described in detail with reference to the embodiment shown in the attached figures.

Figure 1:
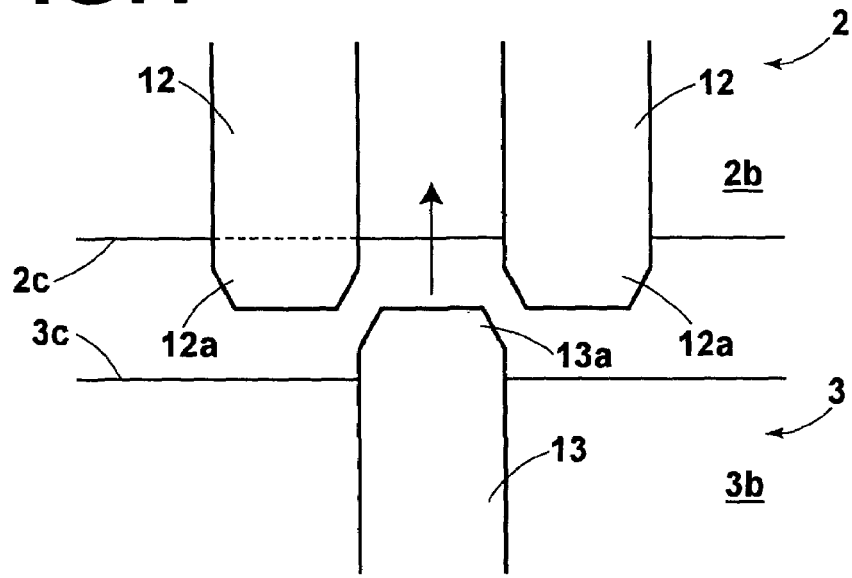
FIG. 1 is a front view showing the structure of inner surfaces of side walls in the vicinity of an opening of an upper case and a lower case of a magnetic disk cartridge according to an embodiment of the present invention, prior to welding.
Figure 2:
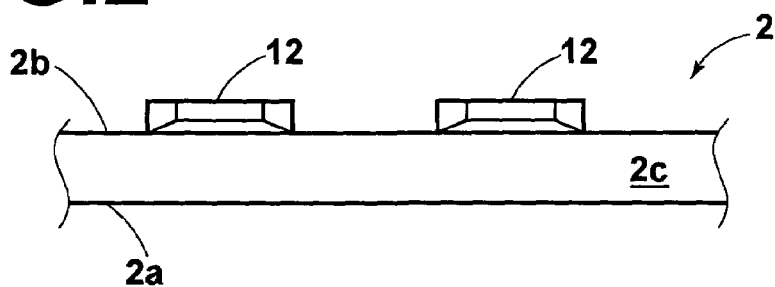
FIG. 2 is a bottom view of the side wall of the upper case of FIG. 1.
Figure 3:
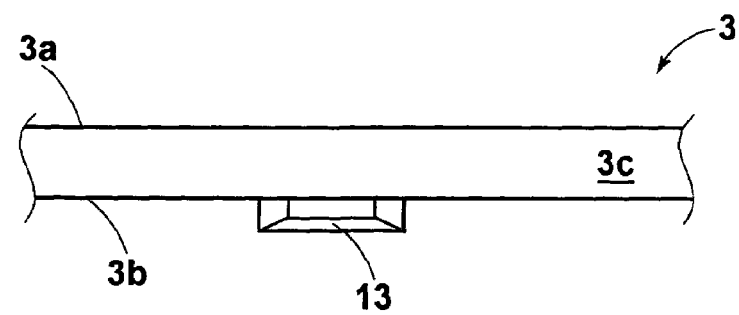
FIG. 3 is a plan view of the side wall of the lower case of FIG. 1.

FIG. 1 is a front view showing the structure of inner surfaces of side walls in the vicinity of an opening of an upper case and a lower case of a magnetic tape cartridge according to an embodiment of the present invention, prior to welding. FIG. 2 is a bottom view of the side wall of the upper case. FIG. 3 is a plan view of the side wall of the lower case.

A side wall of an upper case 2 comprises: a substantially vertical outer surface 2a; a substantially vertical inner surface 2b; and a horizontal bottom surface 2c, which acts as an abutment surface for abutting a side wall of a lower case 3. Two ribs 12 and 12, each having a distal end portion 12a that extends downwardly beyond the bottom surface 2c, are integrally provided on the inner surface 2b in the vicinity of an opening, with a predetermined interval therebetween.

The side wall of the lower case 3 comprises: a substantially vertical outer surface 3a; a substantially vertical inner surface 3b; and a horizontal top surface 3c, which acts as an abutment surface for abutting the side wall of the upper case 2. A rib 13, having a distal end portion 13a that extends upwardly beyond the top surface 3c, is integrally provided on the inner surface 3b so as to be placed between the two ribs 12 and 12 of the upper case 2 in close contact therewith.

Figure 4:
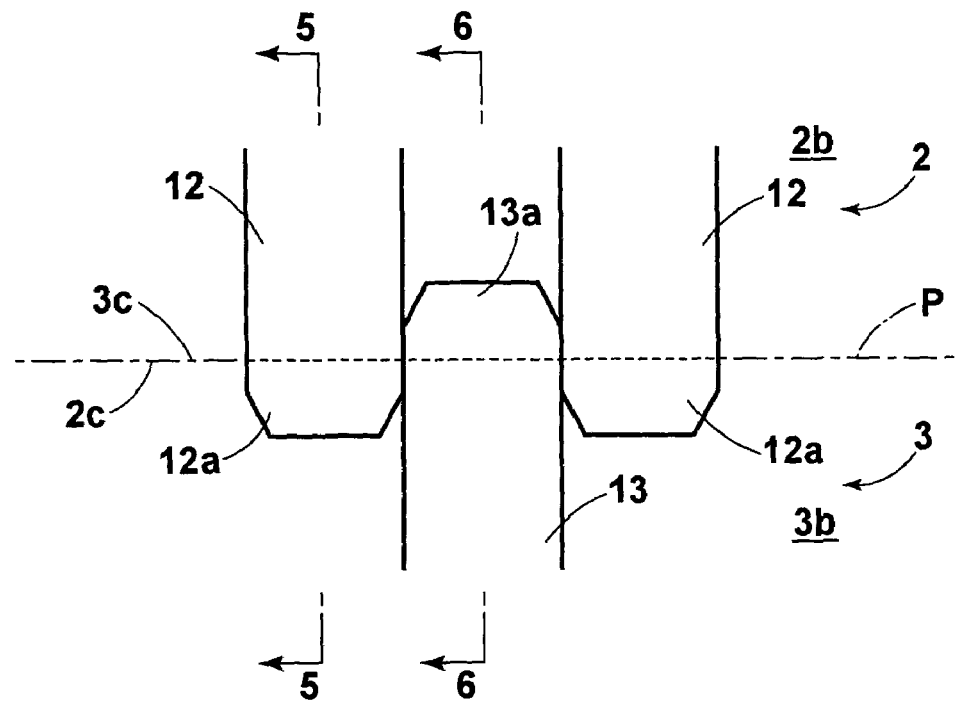
FIG. 4 is a front view showing the structure of the inner surfaces of the side walls in the vicinity of the opening, after the abutment surfaces of the upper and lower cases of FIG. 1 have been welded together.
Figure 5:
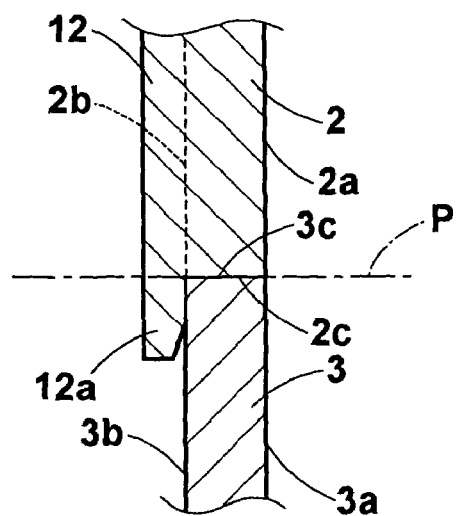
FIG. 5 is a cross sectional view taken along line 5—5 of FIG. 4.
Figure 6:
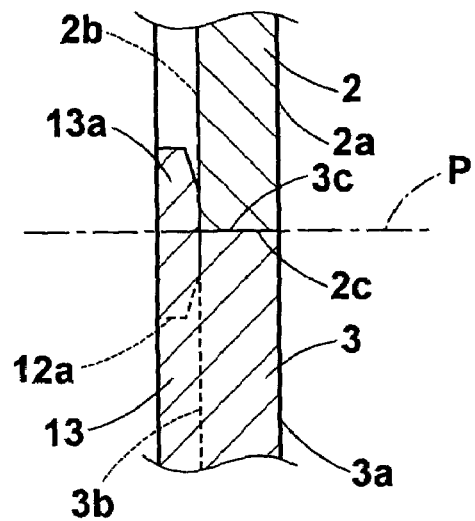
FIG. 6 is a cross sectional view taken along line 6—6 of FIG. 4.

FIG. 4 is a front view showing the structure of the inner surfaces of the side walls in the vicinity of the opening, after the abutment surfaces of the upper and lower cases have been welded together. FIG. 5 is a cross sectional view taken along line 5—5 of FIG. 4. FIG. 6 is a cross sectional view taken along line 6—6 of FIG. 4.

As clearly shown in FIG. 4, the distal end portions 12a, 13a, and 12a alternately extend downward and upward beyond an abutment surface P. At this time, the rib 13 is sandwiched between the two ribs 12 and 12. In this case, it is preferable that both lateral surfaces of the distal end portion 13a, which extends upward beyond the abutment surface P, are in planar contact with inner lateral surfaces of the ribs 12 and 12. It is also preferable that inner lateral surfaces of the distal end portions 12a and 12a, which extend downward beyond the abutment surface P, are in planar contact with both lateral surfaces of the rib 13.

As clearly shown in FIG. 5 and FIG. 6, it is preferable that the distal end portions 12a and 12a, which extend downward beyond the abutment surface P, are in planar contact with the inner surface 3b of the lower case 3. It is also preferable that the distal end portion 13a, which extends upward beyond the abutment surface P, is in planar contact with the inner surface 2b of the upper case 2.

In the present embodiment, ribs 12, 13, and 12, each having distal end portions 12a, 13a, and 12a that extend beyond the abutment surface P, are provided in the vicinity of the opening, as described above. The ribs 12, 13, and 12 having the distal end portions 12a, 13a, and 12a are provided in addition to fixing by welding of the upper case 2 and the lower case 3 at the abutment surface P. Therefore, a dramatic increase in strength of the case 4 at the corner in the vicinity of the opening is obtained.

In addition, the ribs 12, 13, and 12 are provided on the inner surfaces of the side walls of the upper case 2 and the lower case 3 in the vicinity of the opening. Therefore, entry of dust, generated during welding in the vicinity of the opening, into the case 4, can be prevented.

Figure 7:
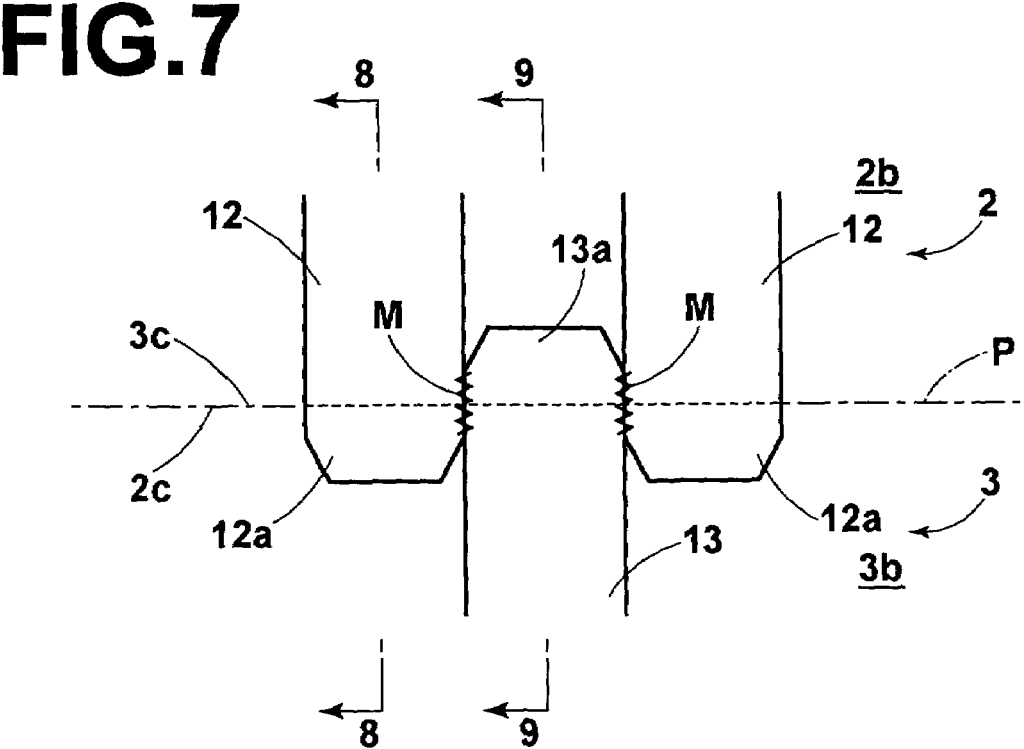
FIG. 7 is a front view corresponding to FIG. 4, showing the upper case and the lower case of FIG. 1 welded together at their abutment surfaces, wherein adjacent ribs are also welded to each other at their lateral surfaces.
Figure 8:
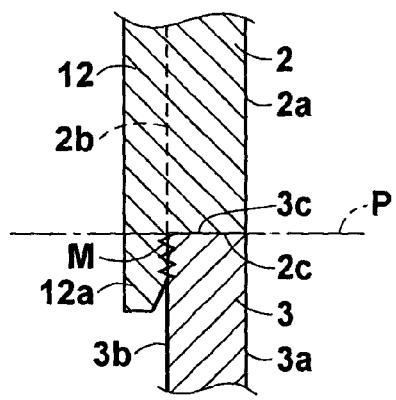
FIG. 8 is a cross sectional view taken along line 8—8 of FIG. 7.
Figure 9:
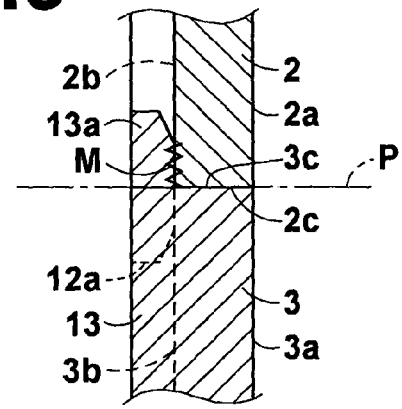
FIG. 9 is a cross sectional view taken along line 9—9 of FIG. 7.
Figure 10:
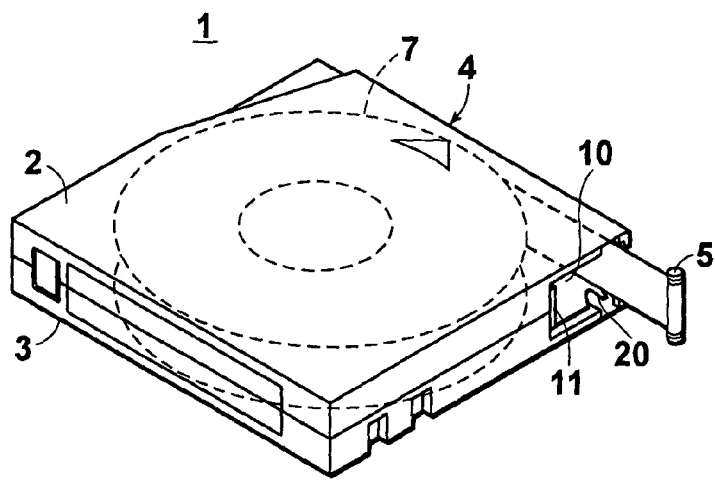
FIG. 10 is a perspective view of a conventional magnetic tape cartridge.

FIG. 7 through FIG. 9 show a structure wherein additional welding portions, denoted by reference letter M, are provided to further increase the strength of the case 4 at the corner in the vicinity of the opening. That is, FIG. 7 is a front view corresponding to FIG. 4, showing a structure wherein adjacent ribs 12 and 13 are welded to each other at their lateral surfaces.

FIG. 8 is a cross sectional view taken along line 8—8 of FIG. 7. FIG. 8 shows a structure wherein the distal end portion 12a of the rib 12, which extends beyond the abutment surface P, is welded to the inner surface 3b of the lower case 3. FIG. 9 is a cross sectional view taken along line 9—9 of FIG. 7. FIG. 9 shows a structure wherein the distal end portion 13a of the rib 13, which extends beyond the abutment surface P, is welded to the inner surface 2b of the upper case 2.

In the structure shown in FIG. 7 through FIG. 9, energy directors (not shown) for ultrasonic welding are provided not only at the abutment surface P where the upper case 2 and the lower case 3 abut each other, but also on the ribs 12 and 13, which are provided to prevent shifting.

Overflow of the material of the energy directors which are melted during ultrasonic welding has been a problem. However, the energy directors for ultrasonic welding are provided closer to the side of the ribs than the center in the thickness direction of the side walls at the abutment surface P, at the portion of the side walls where the ribs 12 and 13 are provided. Therefore, overflow of the melted energy directors can be prevented.

Note that in the present embodiment, two ribs 12 and 12 are provided in the upper case 2, while a single rib 13 is provided in the lower case 3. However, a construction may be adopted wherein the arrangement of the ribs are opposite to that described above. That is, the upper case 2 may be provided with a single rib 12, while the lower case 3 is provided with two ribs 13 and 13. Alternatively, an even greater number of ribs may be provided in the manner described above, to further increase the strength of the case 4 at the corner in the vicinity of the opening.

What is claimed is:

1. A magnetic tape cartridge comprising:
   a cartridge case formed of an upper case and a lower case;
   a single reel rotatably housed within the cartridge case;
   a magnetic tape wound around the single reel; and
   a tape extraction opening provided on a side wall of the cartridge case,
   wherein the cartridge case is integrated by abutment surfaces of the upper case and the lower case which are welded to each other; and
   vertically extending ribs that extend over the abutment surfaces are provided on the inner surfaces of the side walls of the upper case and the lower case, such that the vertically extending ribs cross over a meeting point of the abutment surfaces,
   wherein the magnetic tape cartridge is configured such that before the cartridge case is integrated, and the upper case is separated from the lower case, at least one of the vertically extending ribs is fastened to the upper case and extends towards the lower case, and at least another one of the vertically extending ribs is fastened to the lower case and extends towards the upper case.

2. A magnetic tape cartridge as defined in claim 1, wherein the tape extraction opening is formed across the upper case and the lower case.

3. A magnetic tape cartridge as defined in claim 1, wherein
   the upper case and the lower case are formed from synthetic resin; and
   the abutment surfaces are welded by ultrasonic welding.

4. A magnetic tape cartridge as defined in claim 1, wherein the ribs are provided such that:
   one of the upper case and the lower case is provided with a first rib; and
   the other of the upper case and the lower case is provided with two ribs that sandwich the first rib therebetween.

5. A magnetic tape cartridge as defined in claim 1, wherein the ribs are provided such that lateral surfaces of adjacent ribs are welded to each other.

6. A magnetic tape cartridge as defined in claim 5, wherein portions of the ribs that extend beyond the abutment surfaces are welded to the side walls of the case into which the ribs extend.

7. A magnetic tape cartridge as defined in claim 1, wherein portions of the ribs that extend beyond the abutment surfaces are welded to the side walls of the case into which the ribs extend.

8. A magnetic tape cartridge as defined in claim 1, wherein the vertically extending ribs contact each other when the cartridge case is integrated.

9. A magnetic tape cartridge as defined in claim 1, wherein the vertically extending ribs are provided on a same side of the magnetic tape cartridge.

* * * * *